(No Model.)
J. GREGORY.
LAMP BURNER.
No. 594,007. Patented Nov. 23, 1897.
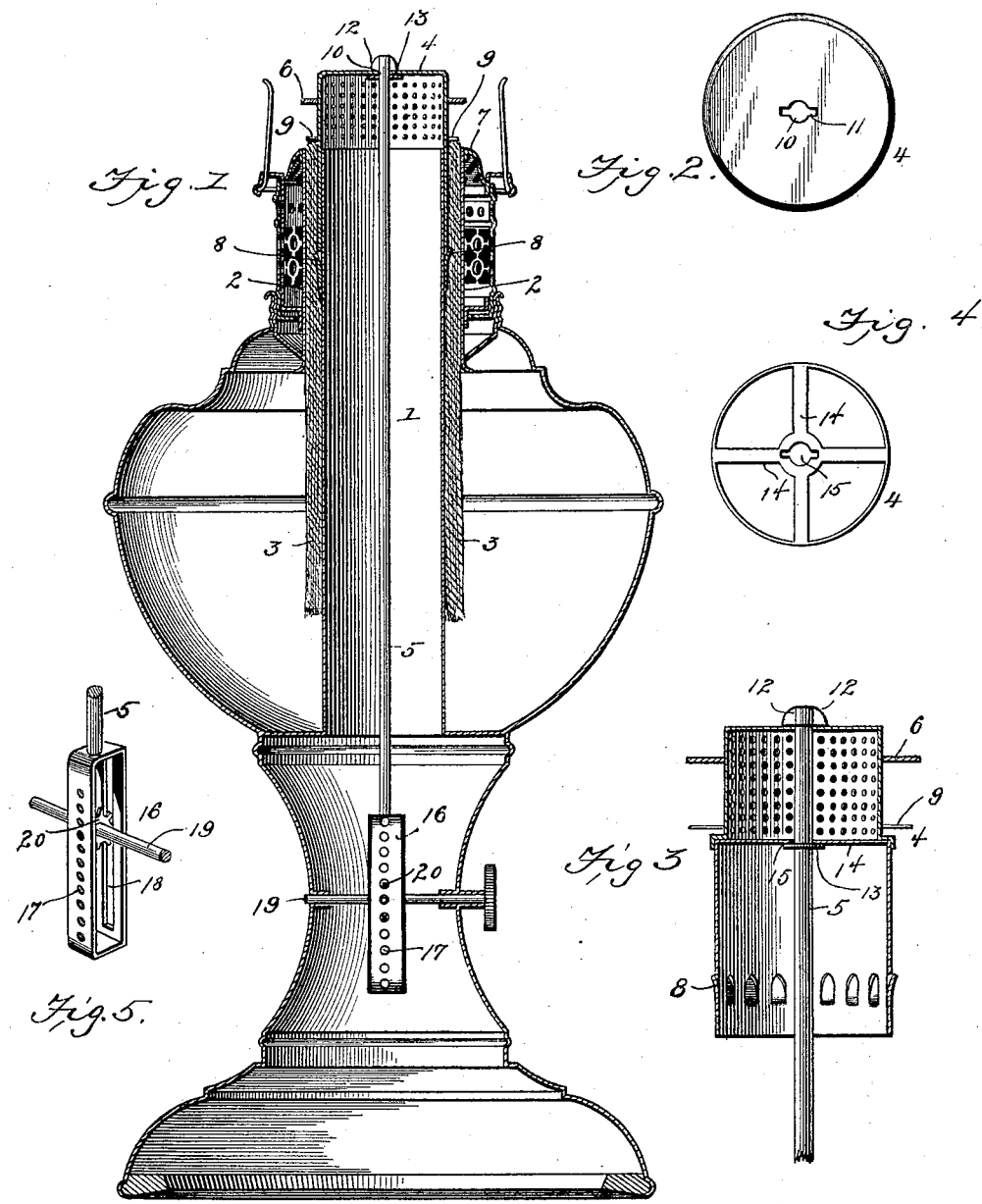
Witnesses
E. H. Monroe
U. B. Hillyard
Inventor
Joseph Gregory,
By his Attorneys.
C.A. Snow & Co.

UNITED STATES PATENT OFFICE.

JOSEPH GREGORY, OF NEW YORK, N. Y.

LAMP-BURNER.

SPECIFICATION forming part of Letters Patent No. 594,007, dated November 23, 1897.

Application filed December 11, 1896. Serial No. 615,342. (No model.)

*To all whom it may concern:*

Be it known that I, JOSEPH GREGORY, a citizen of the United States, residing at New York, in the county of New York and State of New York, have invented a new and useful Lamp-Burner, of which the following is a specification.

This invention relates to oil-lamps embodying in their construction a circular wick-tube and a circular wick, the air being supplied exteriorly and centrally of the wick and the flame being caused to spread by means of a deflector.

The principal object of the invention is to utilize the spreader or deflector as a means for elevating the wick when required, said spreader being provided with outwardly and upwardly inclining teeth which engage directly with the wick when the spreader is elevated and which automatically disengage themselves from the wick when the spreader is lowered, thereby providing for the proper feeding of the wick as the latter is consumed. As a result of this construction it is not necessary to provide separate wick-raising means, as the actuating mechanism for the spreader also answers for feeding the wick in the manner specified.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a central vertical section of a lamp having the improvements applied thereto. Fig. 2 is a top plan view of the spreader. Fig. 3 is a vertical central section of a modified form of spreader. Fig. 4 is a top plan view of the lower part of the spreader shown in Fig. 3. Fig. 5 is a detail view of the means for raising and lowering the spreader.

Corresponding and like parts are referred to in the following description and indicated in the several views of the drawings by the same reference-characters.

The wick-tube is of cylindrical form and comprises an inner casing 1 and an outer casing 2, between the opposing walls of which is received the wick 3. The spreader 4 snugly fits the inner casing 1, upon which it is slidably mounted, and is attached to a rod 5, which is capable of vertical movement for raising and lowering the spreader as required. An extinguisher 6 is secured to the upper portion of the spreader and rests upon the cone 7, so as to extinguish the flame when lowered. A series of teeth 8 are provided at the lower end of the spreader and incline outwardly and upwardly, so as to make direct engagement with the wick 3 upon elevating the spreader and to automatically disengage therefrom when lowering the spreader. These teeth are formed integrally with the spreader by being punched therefrom, and their upper ends are pointed so as to engage with the wick and move the latter. These teeth have a spring tendency and are pressed inward when lowering the spreader and move outward and engage with the wick when the spreader ascends. Pins or projections 9 extend from the sides of the spreader and are adapted to engage with the upper end of the wick, so as to move the latter downward just prior to the settling of the extinguisher upon the cone 7, thereby providing for moving the wick within its tube.

The spreader may consist of a single piece or of two parts, and its upper portion is perforate for the escape of the air, whereas its lower portion is imperforate to enable it to move readily between the wick and inner casing upon lowering the spreader. The upper or closed end of the spreader is formed centrally with an opening 10, from which extend notches 11, the opening 10 corresponding in size with a cross-section of the rod 5 and the notches 11 providing for the passage therethrough of wings 12 at the sides of the rod 5 near its upper end. A shoulder or stop 13 is located adjacent to the wings 12, the space between the upper face of the shoulder 13 and the lower edges of the wings 12 corresponding to the thickness of the end of the spreader. To secure the spreader to the rod, the winged end of the latter is passed through the opening 10 and notches 11, and the parts are relatively turned to bring the wings 12 out of register with the notches 11, whereby the end of the spreader will be securely held between the shoulder 13 and the wings 12, as will be readily understood.

When the spreader is formed in parts, the lower edge of the upper part will be expanded, so as to rest upon and embrace the upper end of the lower part, and the latter will be provided at its upper end with cross-bars 14, provided at their juncture with an opening 15 corresponding with the opening 10 in the end of the upper part, said opening 15 having notches corresponding to the notches 11 to admit of the winged end of the rod 5 passing therethrough. The shoulder or collar 13 is located a distance from the wings 12, corresponding to the position of the cross-bars 14 when the parts are assembled, so as to engage with the cross-bars on their under side when the wings 12 engage with the end of the upper part, thereby holding the parts or sections of the spreader together, as will be readily comprehended.

By constructing the spreader in two parts the upper portion and the wick-raising mechanism can be removed for any required purpose without disturbing the lower portion which supports and carries the wick, and either part can be replaced without necessitating the furnishing of an entire spreader, the greatest advantage residing in enabling the upper portion to be removed when required without necessitating the disturbing of the wick.

The lower end of the rod 5 is provided with a loop 16, one member of which is provided with a series of openings 17 and the opposite member with a longitudinal slot 18. A shaft 19, having a button at one end for the purpose of turning the shaft, is supplied with a pinion 20, whose teeth engage with the perforations 17, the opposite portion of the pinion operating in the slot 18. This shaft 19 is journaled in the contracted portion formed between the base and the fount and is adapted to be turned in the ordinary manner for raising or lowering the spreader and the wick in the manner set forth.

The lamp is prevented from smoking by constructing the loop 16 of proper length and properly arranging the wick upon the spreader, as the upward movement of the latter and the wick is limited by the lower end of the loop engaging with the shaft 19. When from trimming or other cause the wick does not project above the wick-tube a sufficient distance upon elevating the spreader, it is only necessary to lower the rod 5 and the spreader, when the latter will automatically adjust itself and engage with a new portion of the wick, so that upon elevating the spreader the wick will be raised the requisite distance, hence a further advantage in having the spreader constructed so as to automatically engage with and release the wick.

As before stated, the pins 9 limit the extent of the upward movement of the wick and maintain a predetermined distance between the extinguisher 6 and the top edge of the wick.

Having thus described the invention, what is claimed as new is—

1. In combination, a wick-tube, a wick, a spreader provided with teeth inclining upwardly and outwardly and adapted to engage directly with the wick upon elevating the spreader and to disengage from the wick when lowering the spreader, and actuating mechanism for the spreader for raising and lowering it, substantially in the manner set forth.

2. In combination, a wick-tube, a spreader having a series of spring-teeth to engage directly with the wick upon elevating the spreader and to move inward out of engagement with the wick upon lowering the spreader, and means for moving the spreader, substantially as set forth.

3. In a lamp-burner, a wick-tube, a spreader slidably mounted with respect to the wick-tube and provided with means for engaging directly with the wick on ascending and automatically releasing the wick when descending, and actuating mechanism for raising and lowering the spreader, substantially as specified.

4. In combination, a wick-tube, a spreader composed of an upper and a lower part, the latter having a centrally-apertured cross-piece and the former having its top formed with a central opening in coincident relation with the opening of the aforesaid cross-piece, both openings being provided with notches, and an operating-rod detachably connecting the parts having a shoulder to engage with the lower side of the aforesaid cross-piece, and having lateral wings at its upper end to pass through the notched openings of the cross-piece and top, substantially in the manner set forth for the purpose described.

5. In combination, a wick-tube, a spreader, an operating-rod connected with the spreader and having a loop, one member of the loop being longitudinally slotted and the opposite member having a series of openings, a shaft, and a pinion mounted upon the shaft and having its toothed portion adapted to act jointly with the apertured member of the said loop, and having its opposite portion operating in the slotted member of the said loop, substantially as specified.

6. In combination, a wick-tube, a wick, a spreader provided with teeth and lateral projections, and actuating mechanism for raising and lowering the spreader, substantially as and for the purpose set forth.

7. In combination, a wick-tube, a spreader having the wick fitted thereto, a rod having connection with the spreader, a loop applied to the said rod and formed with a series of openings, and a wick-raising shaft passing through the said loop and having a pinion to engage with the openings thereof, substantially as shown for the purpose specified.

8. A spreader for lamp-burners comprising an upper perforate part and a portion provided with means for engaging with and holding the wick, the two parts being connected to move together, substantially as and for the purpose set forth.

9. A spreader for lamp-burners composed of separable parts, the upper part being perforate, and the lower part being supplied with means to engage with and hold the wick, and means for positively connecting the two parts to cause them to move together and prevent their separation except at the will of the user, substantially as set forth.

10. In a lamp-burner, the combination with a central-draft wick-tube, and wick-raising means comprising a rod, of a spreader slidably mounted with respect to the wick-tube and comprising separable parts, the upper part being perforate and having an annular offset, forming an extinguisher, and the lower part provided with teeth to engage with the wick, and means for securing the two parts of the spreader to the rod of the wick-raising means, whereby the parts of the spreader and the wick are moved in unison, substantially as set forth.

In testimony that I claim the foregoing as my own I have hereto affixed my signature in the presence of two witnesses.

JOSEPH GREGORY.

Witnesses:
   CARRIE M. FARRINGTON,
   THOMAS APPLETON.